March 19, 1968  D. T. SWIFT-HOOK ET AL  3,374,368
MAGNETOHYDRODYNAMIC APPARATUS
Filed March 18, 1965  2 Sheets-Sheet 2
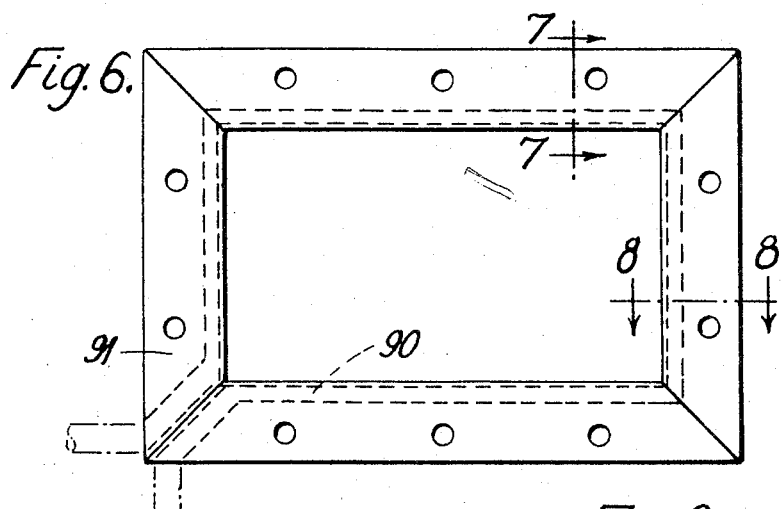
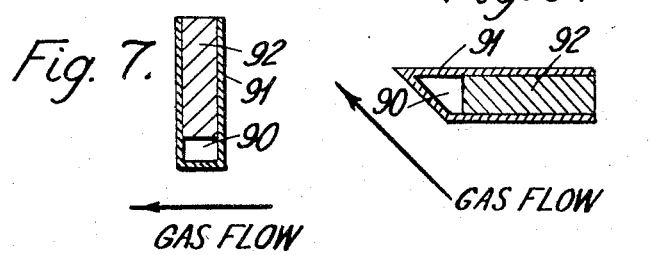
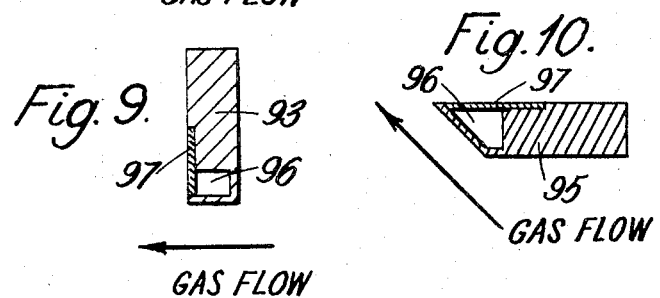
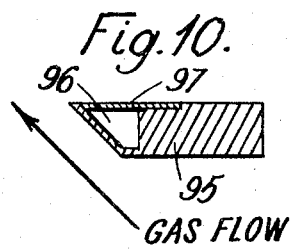

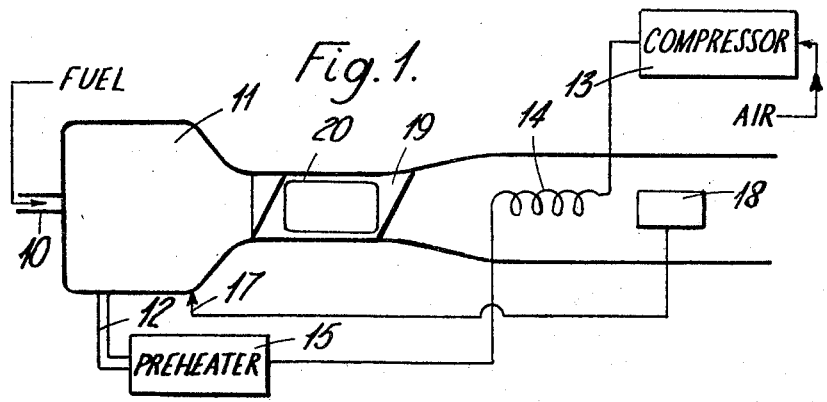
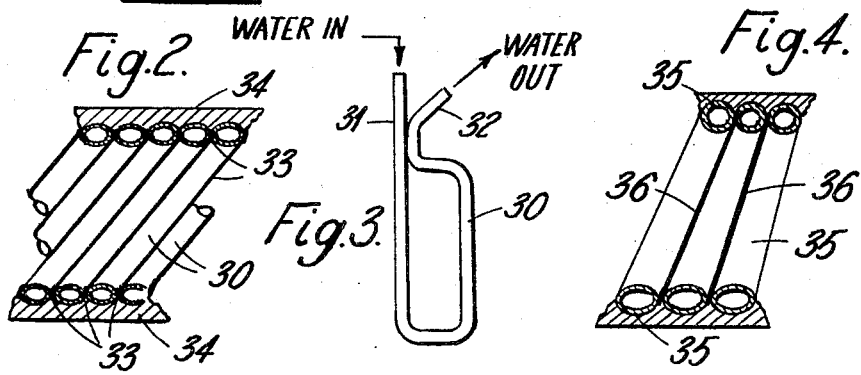
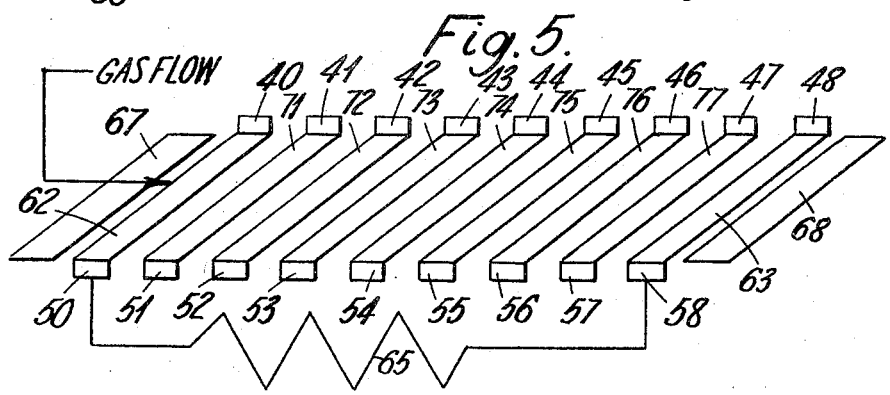

United States Patent Office 3,374,368
Patented Mar. 19, 1968

3,374,368
MAGNETOHYDRODYNAMIC APPARATUS
Donald Thomas Swift-Hook, Dibden Purlieu, John Keith Wright, Ashtead, and John Maycock, Guildford, England, assignors to Central Electricity Generating Board, London, England, a British body corporate
Filed Mar. 18, 1965, Ser. No. 440,821
Claims priority, application Great Britain, Mar. 19, 1964, 11,629/64, 11,741/64; Mar. 20, 1964, 11,958/64
25 Claims. (Cl. 310—11)

This invention relates to magnetohydrodynamic apparatus and particularly to the construction of ducts for such apparatus. The invention is particularly but not solely applicable to electrical power generators of the kind in which electrically conductive gases at a high temperature pass through a duct across which is applied a magnetic field whereby a voltage is produced between spaced electrodes. The invention may also be applied however to magnetohydrodynamic apparatus in which a conductive fluid is accelerated across a magnetic field by applied voltages.

One of the major problems in the construction of magnetohydrodynamic electrical power generators is to construct a duct wall which will withstand the very high temperatures such as are necessary if the combustion products of a fuel are to be electrically conductive. Typically the temperature might be 2,500° C. or above and the gases are generally corrosive since they will usually have to be seeded with an alkali metal, such as a chemical compound containing potassium or caesium, in order to increase the conductivity. Refractory materials such as magnesia will not stand up to these conditions for more than a very short time and the present invention is directed to a method of construction of a duct using metal tubes through which a coolant is circulated.

According to this invention, a duct for magnetohydrodynamic apparatus is constructed of a number of metal tubes, each shaped to form a loop extending completely around the duct, the various loops being stacked together with electrical insulation between them to form a duct with each loop lying in a plane or other surface such that the planes or surfaces correspond with the desired equipotential surfaces and whereby the portions of the tube in contact with the fluid passing through the duct may be utilised as electrodes.

According to a further aspect of the invention, in magnetohydrodynamic apparatus comprising a duct for a conductive fluid and means for producing a magnetic field extending transversely across the duct, the duct wall is formed of a number of metal tubes each shaped to form a loop extending completely around the duct, various loops being stacked together with an electrical insulation between them and with each loop lying in a equipotential plane or surface of the fluid flowing through the duct.

When current flows into or out of the tube loops constituting electrodes, there is a voltage drop associated with the nature of the conduction process in a region very close to the tube resulting in the tube at this point being at a different potential to the conduction fluid (usually a gas) flowing through duct adjacent this point. This potential difference may be around 60 to 100 volts. In addition the tubes will be a finite size and will distort the equipotentials near the tube. Thus due to the tube size, Hall effect and/or voltage drop, the equipotential surfaces in the fluid flowing through the duct will not be simple planes but surfaces terminating on the loops. The equipotential surfaces in the body of the fluid will approximate to planes which will lie at an angle to the planes containing the loops.

In the apparatus described above, the loops may be in flat planes or in any other surfaces as required. The duct will normally be of square or rectangular cross-section but, for particular applications, may be circular. For convenience in the following description it will be assumed that the duct is not angular and that the electrodes are on the top and bottom surfaces and the magnetic field extends across the duct from side to side, the duct axis being horizontal.

The invention is particularly applicable to magnetohydrodynamic electrical generators in which a conductive fluid flows through a duct across which is applied a magnetic field. With the necessary large magnetic fields, the efficiency of a generator having electrodes on opposite sides of the duct spaced in a direction which is orthogonal to the direction of motion of the fluid and to the magnetic field is reduced because of the Hall effect. The electrical conductivity is a tensor quantity and the electric fields and currents are no longer in the same direction. The electric field has components extending both across the duct at right angles to the magnetic field and along the duct. In order to avoid short circuiting the component of the electric field along the duct, it is required to use segmented electrodes that is to say the electrodes which each extend only for a short length in the axial direction. In practice a large number of electrodes will be necessary. These electrodes can be constituted by the aforementioned tubes in the ducts described above.

By the arrangement of the present invention it is possible to make a single tube in the form of a continuous loop around the duct with the top and bottom portions of the loop functioning as upper and lower electrodes; since the electrodes of the loop lie in an equipotential surface, it does not matter that they are electrically connected by the side portions of the loop. The various tubes are insulated from one another and hence a series of separate electrodes are provided on the top and bottom surfaces of the duct. This duct structure thus avoids any short circuiting of the axial component of the electric field; the electrodes can be made as short as desired, within reason, by choice of the section of the tube. It has been found that a water cooled metal tube will give sufficient electron emission to maintain an adequate level of conductivity through the gas stream, but it may be necessary to use a different material for the electrode sections of the duct or to use a sprayed or plated coating or to include a refractory or other material as an insert into the tube. In magnetohydrodynamic apparatus for accelerating a fluid, for similar reasons it is necessary also to have a series of insulated electrodes but electrodes on opposite sides of the duct may be interconnected in equipotential planes. In all these constructions, whether or not the loop is made in sections of the same or different material, the closed loop construction withstands hoop stresses and hence facilitates the construction of a duct to withstand the internal pressures.

In the I.E.E. Conference Report Series No. 4 (1962) "Magnetoplasmadynamic Electrical Power Generation" on page 66 de Montardy has described a particular arrangement of segmented electrode generator in which the power is extracted in a single load. For this purpose he requires that the electrodes be made of such length that, considering any one electrode on one side of the duct, the equipotential lines from the electrode on the opposite side of the duct extent to an electrode adjacent said one electrode on the first side of the duct and that electrical connections should be provided between electrodes on the opposite sides of the duct which are at the same potential. As is shown in the above-mentioned paper, however, such an arrangement can be employed only if the equipotential slopes are greater than or equal to four, that is to say if the distance between opposite electrodes is equal to or greater than four times the spacing between the centres of adjacent electrodes. If this form of connection is used for smaller slopes, long segments must be used which short circuit sections of the axial electric field and very substantially reduce the performance of the generator. Alternatively shorter segments can be employed which in certain circumstances can be used to feed a number of equal loads.

The construtcion of duct using closed loop segments provides a duct which, as previously described, has on two opposite surfaces, a series of spaced electrodes with an equal number of electrodes in each series but with the electrodes in the two series staggered in relation to one another so that corresponding electrodes in the two series lie on equipotential surfaces. The loops furthermore provide electrical connections between corresponding electrodes in the two series. At the two ends of the duct, the closed loops form conductive members connecting the two end electrodes which conductive members are exposed to the gas stream and means are preferably provided for connecting an external load between one or more of the loops constituting the electrodes at one end and one or more of the loops constituting the electrodes at the other end of the duct. Alternatively the load may be connected between solid water-cooled sections at each end of the duct. With this construction, the generator can feed a single load without however having any restrictions on the slopes of the equipotential planes such as are inherent in the prior arrangement described above. In explaining this, it will be assumed, as before, that the electrodes are on the top and bottom surfaces of the duct and hence the side walls are constituted by members electrically connecting the top and bottom electrodes. At each end, the top and bottom electrodes are staggered with respect to one another so that the two end connections lie on the desired equipotential surfaces. Under particular conditions, the current flow is orthogonal to the magnetic field and gas flow and thus, with this construction, along the major part of the length of the duct, the current will flow from one electrode to the opposite electrode. For example, the current may flow from a top electrode to the opposite electrode on the bottom surface. This current will then flow through the equipotential connection from the bottom electrode to another electrode in the top surface. At the two ends of the duct, however, where there are no electrodes directly opposite one another, the current will flow from an electrode near the end to the side portions of the end loop exposed to the gas stream or vice versa.

Since the contributions of various portions of the duct are effectively connected in series, a single high voltage output is obtained. There is no restriction however to systems having large Hall effects. No new insulation difficulties are introduced by having a single high voltage output instead of a number of lower voltage ones since the total voltage range is the same in either case.

Using only a single load in this way, no external connections need be made to the intermediate electrodes along the length of the duct. The closed loops provide the required inter-electrode electrical connections. Connections can readily be made to these intermediate electrodes for measuring or test purposes. Multiple loads can be separately fed, if so desired by connections to the intermediate electrodes. In some cases it may be convenient to feed a single main load and a number of smaller auxiliary loads.

Since the sloping ends of the duct are in equipotential planes, there is no electrical problem in connecting the inlet end to a water-cooled metal inlet section. This section can be made the collector and the load connected to it. Currents from staggered electrodes will then flow across the duct into the collector section.

The closed loops will in general, due to the Hall effect, lie in planes at an oblique angle to the axes of the duct. For practical reasons, it is convenient to make the closed loops lie in flat planes. These may be parallel planes at an oblique angle to the axes of the duct. More particularly however it may be required to have these planes at an angle which increases along the duct in the direction of the gas flow to conform to the change in the equipotential surfaces along the length of the duct and thus the invention furthermore includes within its scope magnetohydrodynamic apparatus comprising a duct for conductive gases and means for producing a magnetic field extending transversely across the duct wherein the duct wall is formed of a number of metal tubes are each shaped to form a closed loop extending completely around the duct, the tubes being spaced in the direction of gas flow through the duct and insulated from one another by a small thickness of insulating material, the insulating material and/or the tube section being arranged so that adjacent tubes lie at a small angle to one another whereby, along the length of the duct, their inclination to the axis of the duct gradually changes. By this construction the tubes can be inclined at an angle which varies in a predetermined manner along the length of the duct in order to attain the maximum electrical efficiency. It is thus possible to make each tube at an angle appropriate to overcome Hall effects. The varying slope may be made to conform to any required law; for example, the change of slope may be uniform or non-uniform along the length of the duct. Also if it is required to maintain a constant slope across the duct at any axial position the tubes may be formed to lie on a surface which is curved to give this or any other required condition.

The required change in slope between successive tubes may be quite small and it may then be possible to achieve the required gradual change in inclination of the tubes by changing the thickness of the insulating material to give a wedge-shaped gap between successive tubes whilst still keeping this insulating material of sufficiently small thickness that over the whole length of the tubes, adjacent tubes are sufficiently close together to cool the gas in the immediate proximity of the insulating material. Preferably however the change in slope is obtained by making the section of the tubes change along their length; in this case insulating material of uniform thickness may be employed between the tubes.

Each closed loop may be formed by bending a tube around into the required form of the loop, typically a rectangle, with the two ends of the tube extending outwardly to permit the inlet and outlet of the coolant which is typically water. However, more than one inlet and/or outlet could be used for each loop.

The tubes may be of circular section but this is not essential and it may be convenient in some circumstances to use tubes of other section for example square section. The section may be different for different walls of the duct and, if the closed loop is of rectangular form, it may be convenient to make those parallel portions of the tube which constitute the electrode surfaces of different section from the portions constituting the other two sides of the loop. The reason for this is that, if the plane of the loops are at a constant angle $\alpha$ to the normal to the axis of the duct, then the width of each tube measured along the axis of the duct in the side walls where the tube is sloping is $d \sec \alpha$ where $d$ is the diameter or width of the tube. In the top and bottom, i.e. electrode portions this would lead to a bigger gap between the tubes than in the side walls since if the tubes were of uniform circular section or uniform width they would be spaced apart in the top and bottom walls a distance $d \sec \alpha$ yet be a diameter or width of only $d$; it is desirable that the insulating material should be as thin as possible since it is necessary for the gas close to the insulating material to be adequately cooled by the near presence of the metal tube. For this reason the tubes in the electrode portion are preferably made of such section that they come closely adjacent to one another to be separated only by a thin layer of the insulating material. A suitable section can extend all round the loop if desired.

More generally, however, it may be preferred to use tubes of non-circular section; for example to make the surface of the tube facing the duct flat and parallel to the direction of gas flow at that point. The tube may be formed by a cover plate or plates enclosing a channel on a frame member or members.

If, as is the common practice, the duct is tapered, the various successive loops may be made of different size so as to build up the required tapered duct.

The tubes are put as close together as possible but they must be insulated from one another in order to avoid short circuiting the axial component of the electric field and for this purpose they are separated by the aforementioned electrical insulation which may typically consist of a layer of sprayed alumina. Alternatively an asbestos gasket or preformed triangular section alumina spacing blocks or a cement of alumina or other suitable material may be employed. If the tubes are circular in section and the insulation lies between the tubes at their closest point, then there will tend to be a stagnant region of gas between the tubes immediately in front of the insulation which stagnant region is cooled by its proximity to the tubes and it has been found that under these conditions a material such as alumina in a thin layer in intimate contact with a cooled metal tube will withstand the gas temperatures of the order of 2000–3000° C. which are necessary in a magnetohydrodynamic electrical power generator of the open cycle type. In practice most of the temperature drop occurs across the boundary layer between the gas and the metal and the coolant, and the metal temperature may typically be 300° C.–400° C. Behind the insulator, that is to say on the surface of the duct remote from the gas stream, further gas-tight sealing means may be provided, for example a resin-bonded glass fibre insulating material. This material may also serve to secure the tubes together and, in one construction, the tubes are secured together with an epoxy resin glass fibre material forming a continuous surface extending along the whole of the duct on the outer side of the tubes. Although the insulation may be gas-tight, any small leakage of the hot gases will burn the duct structure and the provision of the above described further gas-tight sealing means is desirable to prevent any leakage of gas. The tubes however may be secured together by other means, for example they may be bolted to an insulating plate or other support on the outer side of the duct.

The tubes transfer heat to the coolant, which would usually be water. As is well known for heat exchangers, such tubes may have extended inner surfaces, for example they may be provided with fins, in order to facilitate the heat transfer which may have to be at the rate of several megawatts per square metre. As previously indicated, the major part of the temperature drop between the hot gas and the coolant occurs through the boundary layer between the metal and the gas; the metal will be at an intermediate temperature which might typically be of the order of 300–400° C. Thus it is possible to use a metal such as stainless steel or copper or copper alloys for the tube construction.

The following is a description of a number of embodiments of the invention reference being made to the accompanying drawings in which:

FIGURE 1 is a diagram illustrating a magnetohydrodynamic electrical power generating apparatus;

FIGURE 2 is a part of a longitudinal section through one embodiment of the duct of the apparatus of FIGURE 1;

FIGURE 3 is a view in elevation showing one of the closed loop segments from which the duct of FIGURE 2 is constructed;

FIGURE 4 is a diagram illustrating how the closed loop segments may be arranged to form a duct with the planes of the loop gradually changing in slope;

FIGURE 5 is a circuit diagram illustrating how power from the generating apparatus of FIGURE 1 is fed to a load;

FIGURE 6 is a view in elevation of a segment of a further construction of duct;

FIGURES 7 and 8 are sections along the lines 7—7 and 8—8 of FIGURE 6; and

FIGURES 9 and 10 are sections similar to FIGURES 7 and 8 but illustrating a modified form of construction.

Referring to FIGURE 1, there is shown diagrammatically a magnetohydrodynamic power generating apparatus of the open cycle type in which hot conductive gases obtained by burning a fuel are passed through a magnetic field which extends transversely across a generating duct. The fuel is injected at 10 into a combustion chamber 11 where it is burnt using combustion air or oxygen or an oxygen air mixture injected at 12. In the particular arrangement illustrated, air from a compressor 13 is fed through a two-stage pre-heater 14 which heats the air by taking heat from the gases in the outlet from the generating duct. From this pre-heater 14, the combustion air is passed through a further pre-heating stage 15 into the combustion chamber 11. Two main stages of pre-heating are employed in the arrangement shown in FIGURE 1 as typically the combustion air might be heated to a temperature 1200° C. This high temperature of the air is required so that the combustion gases from the combustion chamber 11 passing into the generating duct will be at the required temperature typically of the order of 2500 to 3000° C. A seed material, such as a chemical compound containing potassium or caesium, is injected at 17 into the combustion gases to increase the conductivity of the gases; and most of this seed material is subsequently recovered by seed recovery means indicated diagrammatically at 18 and is re-used.

From the combustion chamber the hot conductive gases pass through the magnetohydrodynamic duct 19 across which extends a magnetic field. In FIGURE 1, the means for producing this field is indicated diagrammatically by the winding 20. The field extends in a direction normal to the plane of the paper. This magnetic field may in practice be produced by a superconductive winding to reduce the power requirements.

The duct 19 is formed of a number of closed loop segments of tubular form one of which is shown in elevation in FIGURE 3. Referring to FIGURE 3, it will be seen that a tube 30 is shaped to form a closed rectangle with a separate inlet 31 and outlet 32 adjacent to one another but not connected so that a coolant fluid, typically water, may be fed in through the inlet 31 and out through the outlet 32. The duct 19 is formed by putting a number of these closed loop segments together; typically a very large number would be employed. These closed loop segments are arranged as shown in FIGURE 2 with each loop closely adjacent to its two neighbours but electrically insulated therefrom by means of insulating material 33. This insulating material typically consists of a layer of sprayed alumina but alternatively an asbestos gasket or preformed alumina spacing block or a cement of alumina or other suitable material may be employed. If the tubes 30 are of circular section and the insulation lies between the tubes at their closest point, there will be a stagnant region of gas between the tubes immediately in front of the insulation. This stagnant region is cooled because it is close to the cooled metal tubes and it has been found that, under these conditions, a material such as the alumina in a thin layer in intimate contact with a cooled metal tube will withstand the temperatures arising from the passage of hot gases through the duct. In practice most of the temperature drop occurs across the boundary layer between the gas and the metal with only a smaller drop between the metal and the coolant, and the metal temperature may typically be of the order of 300 to 400° C. Thus these tubes 30 may be formed of stainless steel or copper or copper alloy. It is necessary to ensure that there is no leakage since if there is any leakage through the insulating material 33 between the tubes, there would no longer be a stagnant region and the temperature would rise. To prevent any possibility therefore of burning of the tubes 30 due to failure of this sealing, there is provided behind the tubes a further gas type sealing comprising, in the particular embodiment illustrated, a resin bonded glass fibre electrical insulating material 34. This resin bonded glass fibre material 34 conveniently serves also to bond the tubes 30 together. It will be appreciated however that the tubes 30 might be secured together by other means for example, by being bolted to an insulating plate.

In the particular embodiment illustrated in FIGURE 2, all the loops 30 lie in parallel flat planes. In this particular case, it is convenient to make the sloping side portions of the tube 30 of circular section. If the plane of the loop is at an angle α to the normal to the axis of the duct, then the width of each tube measured along the axis of the duct in the side walls where the tube is sloping is $d$ sec α where $d$ is the diameter or width of the tube. At the top and bottom portions, which are shown in section of FIGURE 2, this would lead to a bigger gap between the tubes than in the side walls if the tubes were of uniform section along their whole length around the loop. It is desirable that the insulating material should be as thin as possible since it is necessary for the gas close to the insulating material to be adequately cooled by the cooled metal tube and for this reason the top and bottom portions, as shown in FIGURE 2, are made of such section that they come closely adjacent to one another to be separated only by a thin layer of the insulating material 33. Conveniently, this is achieved by pressing these portions of the tube to have an elliptical section.

It will be noted that the closed loop segments need not necessarily be rectangular but can be shaped to give any desired section for the duct. It is however generally convenient to use a rectangular section of duct although, in some cases, a circular section may be preferred. It may be desired that the cross-section of the duct should increase from the inlet to the outlet. This may readily be achieved by making each successive closed loop segment slightly larger in size than the adjacent one along the length of the duct.

The combustion chamber 11 has water cooled metal walls. The generating duct 19 is as close as possible to the combustion chamber; this duct 19 has a sloping end and the magnetic field is shaped accordingly. The duct and the combustion chamber are joined by a suitably shaped duct inlet formed of water-cooled metal plates. The sloping ends of the duct are each in an equipotential plane. Either end may be at earth potential to facilitate joining it to the combustion chamber without problems of electrical insulations.

The angle of slope of the planes of the loops in the duct 19 is arranged so that these planes coincide with the equipotential planes when the duct is working under optimum conditions. These equipotential planes or surfaces may be pre-calculated. For many purposes it is adequate to have a duct formed with loops of constant slope along the length as shown in FIGURE 2. However, it is readily possible as shown in FIGURE 4 to arrange for the slope of these loops gradually to change along the length of the duct, the equipotential planes, along the length of the duct, gradually becoming more normal to the direction of the gas flow. In FIGURE 4 it will be seen that the sections of the tubes 35 forming each closed loop are arranged so that, using thin insulation 36 between adjacent loops of uniform thickness, the slope of each closed loop gradually becomes more normal to the direction of gas flow as one moves along the duct in the direction of the gas flow. In FIGURE 4 for the sake of clarity, the change in slope has been greatly exaggerated and in practice only a small change in slope between each successive loop is required.

A closed loop segment 30 such as is shown in FIGURE 3 may readily be pressed into the required form to produce a duct such as is illustrated in FIGURE 4. Provided the change of slope of successive loops is small, this could be achieved by varying the thickness of the insulation between the loops as appropriate but it is preferred to vary the section of the tubes as shown in FIGURE 4 in order to keep the insulation thickness to a minimum.

The closed loops 30 form series of electrodes along the top and bottom of the duct, the electrodes in the two series being interconnected by the side portions of the loops along the equipotentials. The electrical system is illustrated diagrammatically in FIGURE 5 which shows the top electrodes at 40–48 and the bottom electrodes at 50–58. The electrodes 40, 50 are connected by part of the wall structure indicated at 62 whilst the electrodes 48, 58 are connected by part of the wall structure indicated at 63. The remaining electrodes for example 41, 51, 42, 52 are shown as being connected by electrical connectors 71 to 77 along the equipotential lines. All these electrical connectors between the electrodes are constituted by the side portions of the closed loops 30 forming the wall structure.

The external load is indicated diagrammatically at 65 and is shown as being connected between the electrodes 50 and 58. It will be appreciated that electrodes 50 and 40 are electrically connected by a connector 62 of negligible impedance and hence one end of the load 65 might be connected to electrode 40 instead of electrode 50. Similarly the other end of the load 65 might be connected to electrode 48 instead of electrode 58. In the particular arrangement shown in the drawing the electrode 53 lies opposite the electrode 40 and so, under optimum conditions, the current from the electrode 40 will flow through the gas to the electrode 53 and thence through the equipotential connector 73 to the electrode 43. The current flow is thence from the electrode 43 across to the electrode 56 and thence through an equipotential connector 76 to the electrode 46 and from there to the end of electrode connector 63. Similarly, for example, current can flow from the connector 62 to the electrode 51 and thence via an equipotential connector 71 to the electrode 41 and across to the electrode 54 thence to the electrode 44 and across to the electrode 57 and thence to the electrode 47 and across to the end electrode connector 63. It will be seen that with this construction, the elecrodes can be made as short as desired to obtain the maximum efficiency and any number of electrodes can be employed. However, the generator feeds only a single load. The construction permits of any required slope of the equipotentials and there is only a single output load provided the duct is constructed with its ends having connections between the electrodes and exposed to the gases and lying in the required equipotential planes. It will be noted moreover that the equipotential planes need not be parallel to one another along the length of the duct; the electrodes could be arranged for example so that the slopes of the equipotential planes change gradually along the length of the duct to conform to any required pattern.

Although in FIGURE 5, the load 65 is shown as connected between the two end loops, it may be connected between groups of tubes at each end or to the solid water-cooled sections at the ends of the closed-loop duct structure, which sections are indicated diagrammatically at 67 and 68 in FIGURE 5.

Although the electrical operation has been described under particular conditions when the current flow is at right angles to the axis of the duct, the system will operate if conditions are not optimum; in this case, the current is not entirely transverse to the axis of the duct and the performance is degraded.

In the foregoing description with reference to FIGURES 1 to 5, the construction of the closed loop segments has been described using a single tube shaped to extend completely around the duct. FIGURES 6, 7 and 8 illustrate in further detail one particular form of construction of such closed loop segments, in which FIGURES 10, 11 and 12 illustrate a construction generally similar to that of FIGURES 6 to 9 but in which a tube 90 is formed by brazing or welding a cover plate 91 to a frame 92. This frame 92 may be monolithic or consist of several laminates or sections which may be pinned, brazed or welded together. In the modified form illustrated in FIGURES 9 and 10, the frame 95 is machined or extruded so as to form an open sided channel 96 which is closed by a cover plate 97 to form the coolant passage.

As seen in FIGURES 8 and 10, the coolant passages 90 and 96 are shaped to have a face parallel to the gas flow in the duct.

It will be seen that the forms of construction described with reference to FIGURES 6 to 10 may be arranged for use in ducts where the elements are normal to the axis of the duct or are sloping. The elements may be tapered, as described with reference to FIGURE 4, to vary the angle along the duct. They may also vary in size along the duct to give a tapered duct section if required. The elements may be assembled together in any of the ways previously described; for example, adjacent elements may be assembled together with bolts, studs or dowels, the appropriate holes or lugs being provided for this purpose on the frames. One or more layers of insulating material may be inserted between the elements and their connecting bolts, pins or dowels to insulate the elements from one another. In another arrangement the individual elements are each supported on an external beam.

The electrodes of FIGURES 6 to 10, like the electrodes of FIGURES 2 to 4, may be connected to a single external electrical load or the load may be connected between solid water-cooled end sections as described with reference to FIGURE 5.

Although in the foregoing description, with reference to the drawings, the planes of the elements are, to give optimum conditons, at an oblique angle to the duct axis corresponding with the equipotential surfaces set up by the passage of the conductive fluid through the magnetic field, it will be appreciated that the system will operate with the loop elements not in these particular planes. In particular, the planes of the loop elements might be normal to the axis of the duct so that the system will operate in a manner commonly known as a Hall generator, the output being obtained from the longitudinal component of the field.

By using the closed loop elements to form the duct, it is thus possible to construct a duct for magnetohydrodynamic apparatus which will withstand the high temperatures required in open cycle magnetohydrodynamic power generators. Moreover these closed loops facilitate the operation with a single output load. Only two electrical connections need be made to the duct for the power output circuit. However, the closed loops provide separate insulated electrodes all along the length of the duct if required for measurement or test purposes. The closed loop elements provide a structure for supporting any internal pressure in the duct and for supporting any electromagnetic forces induced in the duct walls.

We claim:

1. A duct for magnetohydrodynamic apparatus constructed of a number of metal tubes, each shaped to form a loop extending completely around the duct, the various loops being stacked together with electrical insulation between them to form a duct with each loop lying in a plane or other surface such that the planes or surfaces correspond with the desired equipotential surfaces and whereby the portions of the tube in contact with fluid passing through the duct may be utilised as electrodes.

2. Magnetohydrodynamic apparatus comprising a duct for a conductive fluid and means for producing a magnetic field extending transversely across the duct, wherein the duct wall is formed of a number of metal tubes each shaped to form a loop extending completely around the duct, the various loops being stacked together with electrical insulation between them with each loop lying in an equipotential plane or surface of the fluid flowing through the duct.

3. Magnetohydrodynamic apparatus as claimed in claim 2 wherein all the closed loops lie in planes at an oblique angle to the axis of the duct.

4. Magnetohydrodynamic apparatus as claimed in claim 2 wherein all the closed loops lie in parallel planes at an oblique angle to the axis of the duct.

5. Magnetohydrodynamic apparatus as claimed in claim 2 wherein the closed loops lie in planes at an oblique angle to the axis of the duct, which angle increases along the duct in the direction of the gas flow.

6. Magnetohydrodynamic apparatus comprising a duct for conductive gases and means for producing a magnetic field extending transversely across the duct, wherein the duct wall is formed of a number of metal tubes each shaped to form a loop extending completely around the duct, the tubes being spaced in the direction of gas flow through the duct and insulated from one another by a small thickness of insulating material, the insulating material and/or the tube section being arranged so that adjacent loops lie at a small angle to one another whereby, along the length of the duct their inclination to the axis of the duct gradually changes.

7. Magnetohydrodynamic apparatus as claimed in claim 6 wherein the portions of the tubes extending transversely to the magnetic field have a section changing along the length of the tube portion and wherein the thickness of insulation between adjacent tubes is uniform, the sections of the tubes being arranged to give the required change in slope of the planes of the loops along the length of the duct.

8. Magnetohydrodynamic apparatus as claimed in claim 2 wherein the various loops along the length of the duct are of sizes varying along said length of the duct to form a duct of non-uniform section.

9. Magnetohydrodynamic apparatus as claimed in claim 2 wherein said conductive gases are hot gases and wherein a coolant fluid is circulated through said tubes.

10. Magnetohydrodynamic apparatus as claimed in claim 9 wherein each closed loop has a separate but adjacent inlet and outlet for the coolant fluid arranged so that the coolant has to pass around the loop from the inlet to the outlet.

11. Magnetohydrodynamic apparatus as claimed in claim 2 wherein said tubes are of rounded section with the insulation between them at their closest point so as to leave a stagnant region of gas between the tubes immediately in front of the insulation.

12. Magnetohydrodynamic apparatus as claimed in claim 11 wherein a gas tight sealing layer is provided on the outer surface of the tube and insulation assembly.

13. Magnetohydrodynamic apparatus as claimed in claim 2 wherein the section of the tube around each closed loop is arranged so that the thickness of insulation between adjacent loops is uniform around the loops.

14. Magnetohydrodynamic apparatus as claimed in claim 2 and arranged as an electrical generator in which conductive gases are passed through the duct across which is applied a magnetic field wherein means are provided for connecting electrical load between one or more of the loops constituting the electrodes at one end of the duct and one or more of the loops constituting the electrodes at the other end or between solid water-cooled sections at each end.

15. Magnetohydrodynamic apparatus as claimed in claim 14 wherein means are provided for additionally connecting subsidiary loads between electrodes along the duct.

16. A duct for magnetohydrodynamic apparatus comprising a number of metal tubes each shaped to form a closed loop with a separate inlet and outlet for circulating a coolant through the loop, the loops being stacked together so that the apertures of the loops form a duct and the loops being separated by electrical insulating material, the thickness of which insulating material between adjacent tubes is smaller than the cross-sectional dimensions of the tubes.

17. A duct as claimed in claim 16 wherein the loops are in planes at an oblique angle to the axis of the duct.

18. A duct as claimed in claim 16 wherein the insulating material is alumina or asbestos.

19. A duct as claimed in any of claim 16 wherein the section of the tubes is made such that, using a uniform thickness of insulating material, the planes of the loops gradually change along the length of the duct.

20. A duct as claimed in claim 16 wherein the loops each lie in a plane normal to the axis of the duct.

21. A duct as claimed in claim 20 wherein the loops are rectangular with two opposite sides in a direction normal to the axis of the duct and wherein the cross-sectional dimension of these two sides in the direction of the axis of the duct differ from the cross-sectional dimensions of the remaining two sides so that the thickness of the insulating material is uniform around the loop.

22. A duct as claimed in claim 16 wherein the tubes are of rounded section and, on the inner surface of the duct, the insulating material extends inwardly only to the region where the adjacent tubes are closed together.

23. A duct as claimed in claim 16 wherein a gas tight sealing layer is provided on the outer surface of the tube and insulation assembly.

24. A duct for magnetohydrodynamic apparatus comprising a number of metal frame members extending around the duct, electrical insulating material spacing said frame members apart along the length of the duct, which insulating material is thin compared with the axial width of the frame members, each frame member being formed to have a channel and cover plates enclosing said channels, the channels and cover plates being arranged to form a coolant passage around each frame member adjacent the surface thereof forming the boundary wall of the duct.

25. A duct as claimed in claim 24 wherein said frame members and cover plates are arranged so that the coolant passage is bounded by a thin flat wall forming, on one face, the surface of the duct, said flat wall being parallel to the direction of fluid flow through the duct over that surface.

No references cited.

DAVID X. SLINEY, *Primary Examiner.*